UNITED STATES PATENT OFFICE.

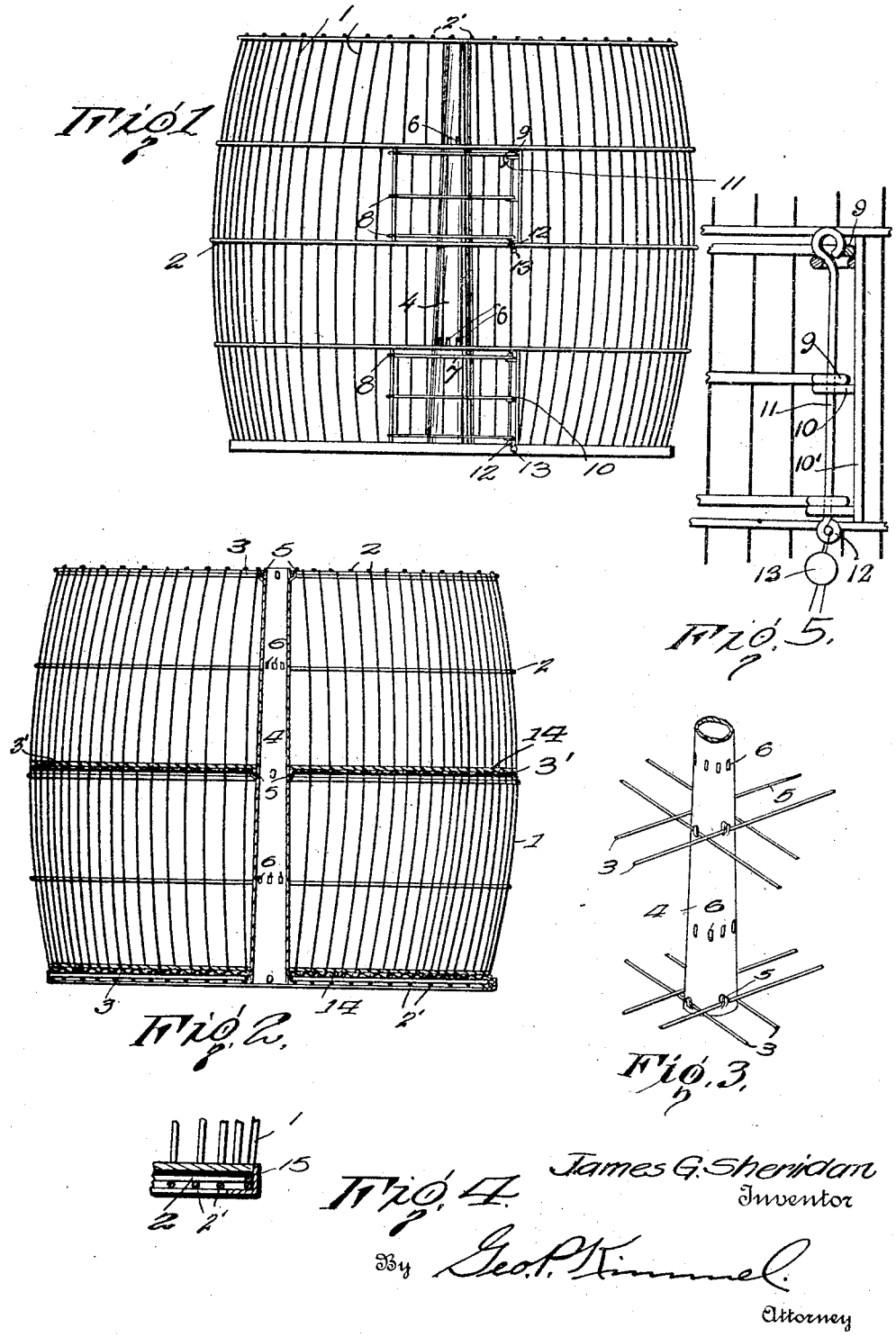

JAMES G. SHERIDAN, OF PARNELL, IOWA.

POULTRY-COOP.

1,287,469.  Specification of Letters Patent.  Patented Dec. 10, 1918.

Application filed December 5, 1917. Serial No. 205,597.

*To all whom it may concern:*

Be it known that I, JAMES G. SHERIDAN, a citizen of the United States, residing at Parnell, in the county of Iowa and State of Iowa, have invented certain new and useful Improvements in Poultry-Coops, of which the following is a specification.

This invention relates to improvements in shipping and storing receptacles and the invention has for its object to provide an exceedingly strong and durable, light, portable and compact poultry coop, the construction of which is such as will materially simplify and reduce the cost of manufacture of devices of this character and provide novel details in the construction and arrangement of parts with a view to higher efficiency generally.

Another and equally important object of the invention is to provide an extremely sanitary poultry coop which when in use, will insure perfect ventilation, thus preventing the breeding of disease and eliminating all obnoxious odors, heretofore present in such devices, thus allowing the poultry to thrive therein during shipping or storing.

Other objects will be in part obvious and in part pointed out hereinafter.

The invention consists, furthermore, in the novel arrangements and combinations of the parts of the coop, as well as in the details of the construction of the same, all of which will be more fully described in the following specification, and then finally embodied in the clauses of the claim which are appended to the specification and which form an essential part of the same.

The invention is clearly illustrated in the accompanying drawings, in which:—

Figure 1 is a side elevation of the improved coop,

Fig. 2 is a vertical section therethrough,

Fig. 3 is a fragmental detail in perspective of the stay,

Fig. 4 is a fragmental detail in section of the bottom of the same, and

Fig. 5 is a fragmentary detail in perspective of the door and its connection with the coop.

Having more particular reference to the drawings and in connection with which like reference characters will designate corresponding parts throughout the several views, my improved coop is formed from a plurality of jointed vertically and horizontally disposed wires, indicated by the numerals 1 and 2 respectively. In this connection, it is to be noted that the horizontally disposed wires 2 are circular, while the vertically disposed wires 1 are bowed slightly, thus giving the coop the shape of a barrel. A plurality of the vertically disposed wires 1 are arranged circumferentially about the horizontally disposed wires 2 and secured thereto by welding or other suitable means; the space between the wires is such as to prevent the escape of the poultry from the coop. Other wires 2' are extended transversely over the opposite extremities of the coop and as will be understood, have the opposite ends of the same joined to the adjacent horizontally disposed wires 2 by welding or other suitable means common to the art.

Diametrically arranged pairs of bracing wires generally indicated by the numeral 3 are provided and have their opposite ends secured to the adjacent portions of certain of the horizontal wires 2 by welding or like means and as will be noted, cross each other at substantially right angles. Thus, the wires 2 engaged thereby are braced and as a consequence, collapsing of the coop or crushing of the same by laterally applied force will be prevented. Over the wires 3 wire mesh 3' is arranged and serves as a flooring.

As means for bracing the central portion of the coop and preventing crushing of the same by vertically applied forces, I employ a hollow tapered stay member 4, striking tongues 5 outwardly from the sides thereof at points adjacent the crossed diametrically disposed bracing wires 3, which tongues serve as means for receiving such wires, thereby effectually supporting the intermediate portions of the same, and as above stated, bracing the coop construction against vertically applied forces. It is of course to be understood that the bracing wires 3 are secured either to the outwardly struck tongues 5 or the adjacent portions of the stay member 4 by welding or other suitable processes. To insure ventilation, circumferentially arranged openings 6 are formed in the stay member at points in proximity to the opposite ends thereof.

Openings are formed in the sides of the coop and are adapted to be closed by doors 7, which doors as will be noted, are formed from horizontally and vertically arranged wires, certain of the ends of the horizontal wires being provided with loops 8 while the remaining ends thereof are looped as at 9. Loops 10 are also arranged on rods 10' supported between the horizontally disposed wires 2 and are adapted to be alined with the loops 9, whereby an elongated locking pin 11 may be passed therethrough, the lower end of the said pin being looped as at 12 in order that a seal or other form or locking means 13 may be passed through the same. Thus, it will be readily understood, that when the loop members 8 have been engaged with the vertically disposed wires 1 adjacent one side of the openings formed in the coop and the elongated pin 11 has been passed through the looped ends 9 and 10 and locked, an effective closure will be provided for the coop, thereby preventing the escape of poultry and also theft of the same. It may be here noted, that the openings formed in the sides of the coop aline with the diametrically disposed stay wires 3 which stay wires and wire mesh 3' have mats 14 removably arranged thereon. Thus, the poultry may be readily removed from the several decks or floors with but little effort and without liability of injuring the same.

To prevent distortion of the bottom of the coop during handling of the same, an annular angle-iron brace is arranged over the lower edge thereof, thus serving as a protector.

From the foregoing, it will be readily understood by workers skilled in the art that I have provided a coop which may be advantageously used in the storing or shipping of poultry. Due to the novel shape of the coop, the same may be readily moved, the circular ends afforded by the horizontal wires 2 allowing the same to be rolled in a manner similar to the way in which barrels and the like are handled.

I desire to have it understood that the horizontally and vertically disposed wires from which my improved coop is constructed may be varied in size or thickness to more efficiently brace the construction, such as conditions or preference may dictate. Further, I preferably employ galvanized wire in the manufacture of the improved coops due to its non-rusting qualities; although it will be readily understood that any form of wire or other suitable material may be employed and if desired, may be coated with a suitable composition.

Manifestly, the construction shown is capable of considerable modification and such modification as is within the scope of my claims, I consider within the spirit of my invention.

I claim:—

1. A poultry coop comprising a receptacle formed from jointed horizontally and vertically disposed wires, a tubular stay arranged in the receptacle and engaged with certain of the horizontal wires, said tubular member having series of openings formed therein, the sides of the receptacle having openings formed therein, and removable closures for said openings.

2. A poultry coop comprising a receptacle formed from jointed horizontally and vertically disposed wires, and a tubular stay arranged in the receptacle and engaged with certain of the horizontally disposed wires, said stay having series of openings formed in the sides thereof.

3. A poultry coop comprising a receptacle formed from jointed vertically and horizontally disposed wires, some of said horizontally disposed wires being circular in shape, diametrically extending bracing wires engaged with the circular horizontal wires, a tubular stay arranged concentrically of the circular wires and engaged with said bracing wires, said stay having series of openings formed in the sides thereof.

4. A poultry coop comprising a receptacle formed from jointed vertically and horizontally disposed wires, some of said horizontally disposed wires being circular in shape, diametrically disposed bracing wires engaged with certain of said circular wires, a tubular stay arranged substantially concentrically of the circular wires and engaged with said bracing wires, and removable floors supported on the bracing wires.

5. A poultry coop comprising a receptacle formed from jointed vertically and horizontally disposed wires, a tubular stay arranged in the receptacle and engaged with certain of the horizontally disposed wires, said stay having series of ventilating openings formed therein and floors removably mounted on said horizontally disposed wires.

In testimony whereof, I affix my signature hereto.

JAMES G. SHERIDAN.